3,394,760
OPERATIONS IN SUBMARINE AND
OTHER WELLS
Thomas W. Childers, Metairie, La., and Kenneth A.
Kline, Harper Woods, Mich., assignors to Esso
Production Research Company
Filed Mar. 20, 1967, Ser. No. 624,516
10 Claims. (Cl. 166—46)

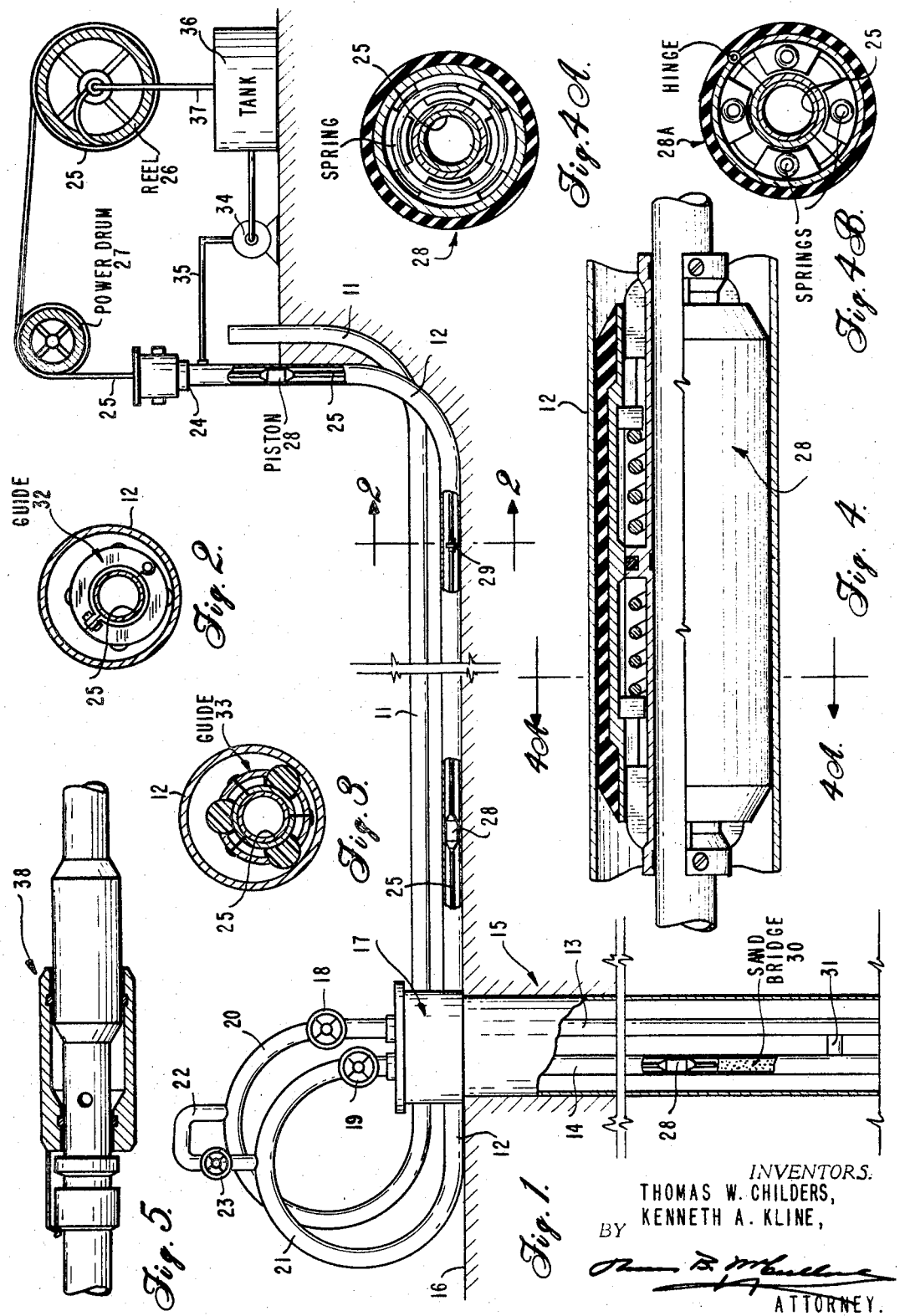

ABSTRACT OF THE DISCLOSURE

Fluid is circulated in and a continuous length of pipe is run into a well conduit by applying force to the pipe adjacent the point it enters the conduit and applying fluid pressure against the pipe at a plurality of spaced apart points in the conduit, the fluid being returned to the surface after circulation.

BACKGROUND OF THE INVENTION

Field of the invention

The present invention is directed to a method for operations in wells drilled to penetrate hydrocarbon productive subsurface formations. More particularly, the invention is concerned with operations in a submarine well drilled to penetrate hydrocarbon productive strata. In its more specific aspects, the invention is concerned with well operations involving a continuous length of pipe which is introduced continuously from the earth's surface, whether it be water or land.

Description of the prior art

It is known to introduce a continuous length of pipe into a well under pressure by force applied to the pipe as it enters the well. It is also known to circulate fluid in a well. Heretofore it has not been known to introduce a continuous length of pipe into a well conduit and propel it through the conduit by a combination of force and fluid pressure exerted against the pipe in the conduit at spaced apart points. Specific prior art considered in relation to the present invention includes the following listed U.S. Patents: 3,116,781, 3,116,793.

Summary of the invention

The present invention may be briefly described as a method for circulating fluid and running a continuous length of pipe through a conduit in a well wherein a free end of the pipe is introduced into the conduit at the upper terminus of the well. Force is applied on the pipe adjacent the point where the pipe enters the conduit to cause the pipe to travel through the conduit. Fluid pressure is applied against the pipe such as against pistons attached to the pipe at a plurality of spaced apart points in the conduit and the fluid is then returned either through the pipe to the upper terminus of the well or the parallel flow line via the by-pass valve or the crossover at the bottom of the well.

The method also involves retrieving the pipe and causing it to travel through the conduit by circulating fluid under pressure through the pipe and applying the fluid under pressure at a plurality of spaced apart points in the conduit while force is applied to the pipe as it leaves the conduit. Fluid under pressure may also be applied by circulating through a parallel tubing flow line string (not shown) connected at the bottom end of the conduit.

In both aspects of the present invention, whether it be running the pipe into the well or retrieving the pipe from the well, friction between the outer wall of the pipe and the inner wall of the conduit may be reduced at a plurality of spaced apart points such as by applying friction reducing means to the pipe.

The invention also involves apparatus for circulating fluid and running a continuous length of pipe through a conduit in a well which apparatus involves a continuous length of pipe adapted to be inserted in the conduit. Means are provided for applying force to the pipe adjacent the terminus of the conduit exterior to the well. A plurality of spaced apart piston means are arranged on the pipe in the conduit with the piston means being provided with means for delivering a selected pressure past the piston means. A plurality of spaced apart friction reducing means may be arranged optionally on the pipe in the conduit to reduce the friction between the outer wall of the pipe and the inner wall of the conduit, and lastly, means are provided for flowing fluid through the conduit.

The apparatus of the present invention also involves a normally closed means downstream from each of the pistons openable on application of a selected internal pressure against said normally closed means for discharge of fluid from the pipe. The normally closed means may be a differential pressure sleeve valve or a frangible member which will rupture at a selected pressure.

The friction reducing means employed in the present invention may be a releasably attached nylon guide member arranged on the exterior of the pipe or a releasably attached ball bearing guide member. Other suitable friction reducing means may be used.

Utility and advantages of the invention

The present invention is quite advantageous and useful since sand often bridges in tubing strings and flow lines of wells producing from unconsolidated sand formations which may contain hydrocarbons. Ordinarily, these sand bridges are removed from the tubing by either bailing the sand from the tubing with wireline tools or by inserting a small diameter tubing string into the plugged tubing string and washing the sand out by circulating fluids down the annular space and back up through the smaller tube. In submarine wells, vertical access to the tubing is not readily available and flow lines from these wells may be long and inaccessible and also subject to sand bridging. The method and apparatus of the present invention is useful in removing such sand accumulations and in performing workover and servicing operations.

Particularly the invention allows sand to be washed up the continuous length of pipe rather than up the annulus between the pipe and the tubing. This greatly reduces the chances of the continuous length of pipe becoming stuck in case of a pump failure or other interruption of fluid flow.

Thus, the invention is applicable to workover operations involving fracturing, acidizing, cementing, and is also applicable to production since the pipe run into the conduit may be used as a production tubing. Likewise, while the method and apparatus of the present invention are primarily oriented toward submarine wells where there are curved or deviated pipes, the invention is broadly applicable to any well and to any flow line or any particular type of well.

Brief description of the drawing

The present invention will be further illustrated by reference to the drawing in which FIGURE 1 is a diagrammatic illustration of the invention wherein a well is drilled on water bottom and there is a long flow line with numerous bends in it;

FIGURE 2 is a sectional view taken along line 2—2 of FIGURE 1 showing one form of a friction reducing means;

FIGURE 3 is a showing of another form of a friction reducing means;

FIGURE 4 illustrates a regulating piston employed in the present invention;

FIGURE 4A is a view taken along line 4A—4A of FIGURE 4;

FIGURE 4B is a modification of the device of FIGURE 4 and 4A; and

FIGURE 5 is an illustration of a differential pressure operated sleeve valve.

*Description of the preferred embodiments relative to the drawing*

Referring now to the drawing and particularly to FIGURE 1, numerals 11 and 12 designate well flow lines which are connected to tubing strings 13 and 14 in a cased well 15 which is drilled to penetrate hydrocarbon productive formation below sea bottom 16.

Flow lines 11 and 12 are connected to tubing strings 13 and 14 through a Christmas tree generally indicated by the numeral 17 comprised of valve members 18 and 19 and radius bends 20 and 21 which are interconnected by by-pass line 22 controlled by valve 23. Inserted into the upper end 24 of flow line 12 which is suitably a lubricator or stuffing box is a continuous length of pipe 25 which leads from a reel 26 over a power drum 27. The continuous length of pipe 25 is inserted in the flow line 12 and extends through the radius bend 21 down into the tubing string 14.

At spaced apart points on the continuous length of pipe 25 are pistons 28, the function of which will be described further. Likewise, at spaced apart points on the pipe 25 are friction reducing means 29. The reel 26 and the power drum 27 may be similar to the device described in the McStravick Patent 3,116,793 issued Jan. 7, 1964, and the pipe 25 may be injected into the flow line 12 in accordance with the method described by McStravick, supra.

It is to be noted that there is a sand bridge 30 in the tubing 14 and that the tubings 13 and 14 are interconnected fluidly by connecting means 31.

Referring now to FIGURE 2, it will be seen that the pipe 25 in the flow line 12 has a snap-on or detachable guide 32 which serves as a friction reducing means which has been generally described by the numeral 29. The guide means 32 has ball bearings spaced about its periphery. Likewise, in FIGURE 3, the flow line 12 has a pipe 25 therein and a clamp-on Teflon or nylon guide 33 arranged thereon. Like the guide 32, the guide 33 serves as a friction reducing means such as designated by numeral 29.

The pistons 28 described in FIGURE 1 are shown more clearly in FIGURE 4 and are comprised of elements which allow fluid to flow past or through the pistons 28 at a selected pressure. Thus, in accordance with the present invention, pressure would be exerted against the last of the pistons on the pipe 12 until a certain pressure was reached and then that piston would allow excess pressure to be released downstream against the next piston and so on until the pipe 25 has been run into the desired point in the well. This is accomplished by employing pressure from pump 34 arranged in line 35 which communicates with flow line 12 and tank 36 which in turn communicates by line 37 with the pipe 25 on reel 26.

Pistons 28 allow the force due to fluid pressure to be distributed along the length of pipe 25 which avoids any concentrations of stress which might arise if fluid pressure were applied at one point to force the pipe. Moreover, a plurality of pistons 28 allow control of the forces imposed against pipe 25. With a plurality of pistons 28 the forces applied to the pipe 25 may be selected or predetermined or may be controlled to achieve the best result. For example, in one instance a different pressure differential may be used than in another instance. It is contemplated that a differential pressure may be obtained across the pistons in either direction. The pistons 28 may be of a snap-on or detachable type such that any number of pistons may be connected detachably to the pipe 25 as it is being inserted in flow line 12 or detached as the pipe is removed from flow line 12.

Referring now to FIGURE 5, a differential area sleeve valve 38 is shown. This differential sleeve valve 38 may be arranged in the pipe 25 downstream from each piston to allow and facilitate removal of the pipe 25 from the flow line 12 should the pipe 25 become plugged with debris before the sand bridge 30 is completely washed out.

Thus, in accordance with the present invention, the pipe 25 will be inserted in the flow line 12 with pistons such as 28 and friction reducing means such as 29 arranged thereon at spaced apart intervals. Force is applied to the pipe 25 by the power drum 27. Fluid pressure would be introduced also into the flow line 12 against the piston and the combined force from drum 27 and the fluid pressure causes the pipe 25 to be introduced through the flow line 12 and into the tubing 14 as desired.

The pipe 25 may be removed by reverse circulation such as by flowing fluid down the flow line 11 and tubing 13 and up the annulus A between the pipe 25 and the tubing 14 and flow line 12 with the pistons 28 being so designed to allow pressure to be exerted against the several pistons as described while applying force with the power drum 27 in the reverse direction. In the event the pipe 25 becomes plugged while washing sand or debris from the tubing 14, the pipe 25 may be removed by reversing circulation down the pipe 25 through a differential sleeve valve 38 or frangible member (opened by exerting a selected internal pressure) and up the annulus A between the pipe 25 and tubing 14 and the flow line 12. Pressure applied on the pistons 28 from below would assist removal of the pipe 25 from the tubing 14 and flow line 12.

The piston assembly shown in FIGURES 4 and 4A is provided with two compressing springs which, upon compression thereof, allow relative movement between the piston and the pipe 25 and therefore passage of fluids through the piston assembly. The spring on the left is used when running pipe into the well and the heavier spring on the right is used when removing the pipe 25 from the well bore. In case of a snap-on or clamp-on type piston the assembly would have to be split and hinged as shown by 28A in FIGURE 4B. Also the springs of FIGURE 4 would have to be replaced with spaced-about sets of compression springs as shown.

It is to be understood that the guide members 32 and 33 which serve as friction reducing means such as 29 are designed to allow fluid to pass the friction reducing means 29.

The present invention allows the workover and servicing of wells without the necessity of using workover rigs. In accordance with the present invention, by forcing the pipe into the well using a combination of force and fluid pressure to introduce the pipe, and the combination of force and fluid pressure to remove the pipe with friction reducing means, it is possible to run and remove the pipe without undue delay. Thus, wells will be worked over and serviced with a minimum of time and a minimum of equipment which will result in large savings. Likewise, in the case of wells drilled offshort, such workover operations may be performed from remote accessible locations such as barges or platforms or even from on shore.

The nature and objects of the present invention having been fully described and illustrated and the best mode and embodiment contemplated set forth, what we wish to claim as new and useful and secure by Letters Patent is:

1. A method for circulating fluid and running a continuous length of pipe through a conduit in a well which comprises introducing a free end of said pipe into said conduit at the upper terminus of said well;

applying force on said pipe adjacent the point it enters said conduit to cause said pipe to travel through said conduit;

applying fluid under pressure against said pipe at a plurality of spaced apart points in said conduit; and returning said fluid through said pipe to the upper terminus of said well.

2. A method in accordance with claim 1 in which said pipe is caused to travel through said conduit by circulating fluid under pressure through said pipe and applying said fluid under pressure against said pipe at a plurality of spaced apart points in said conduit while force is applied to said pipe as it leaves said conduit.

3. A method in accordance with claim 2 in which friction between the outer wall of said pipe and the inner wall of said conduit is reduced at a plurality of spaced apart points.

4. A method in accordance with claim 1 in which friction between the outer wall of said pipe and the inner wall of said conduit is reduced at plurality of spaced apart points.

5. Apparatus for circulating fluid and running a continuous length of pipe through a conduit in a well which comprises a continuous length of pipe adapted to be inserted in said conduit;

means for applying force to said pipe adjacent the terminus of said conduit exterior to said well;

a plurality of spaced apart piston means arranged on said pipe in said conduit, said piston means being provided with means for delivering a selected pressure past said piston means;

a plurality of spaced apart friction reducing means arranged on said pipe in said conduit to reduce the friction between the outer wall of the pipe and the inner wall of said conduit; and means for flowing fluid through said conduit.

6. Apparatus in acordance with claim 5 in which the pipe is provided with normally closed means downstream from each of said pistons openable on application of a selected internal pressure against said means for discharge of fluid from said pipe.

7. Apparatus in accordance with claim 5 in which the friction reducing means is a releasable nylon guide member.

8. Apparatus in accordance with claim 5 in which the friction reducing means is a releasable ball bearing guide member.

9. Apparatus in accordance with claim 6 in which the normally closed means is a differential pressure sleeve valve.

10. Apparatus in accordance with claim 6 in which the normally closed means is a frangible member.

References Cited
UNITED STATES PATENTS 3,163,226 12/1964 Lagucki _____ 166—155
3,346,045 10/1967 Knapp et al. _____ 166—46

JAMES A. LEPPINK, *Primary Examiner.*